(12) United States Patent
Meurs

(10) Patent No.: US 9,078,388 B2
(45) Date of Patent: Jul. 14, 2015

(54) SEMI-MOUNTED REVERSIBLE PLOW WITH ROTARY AMPLIFIER

(75) Inventor: Wilhelm Meurs, Alpen (DE)

(73) Assignee: Lemken GmbH & Co. KG, Alpen (DE)

(*) Notice: Subject to any disclaimer, the term of this patent is extended or adjusted under 35 U.S.C. 154(b) by 0 days.

(21) Appl. No.: 13/696,849

(22) PCT Filed: May 6, 2011

(86) PCT No.: PCT/DE2011/001044
§ 371 (c)(1),
(2), (4) Date: Nov. 8, 2012

(87) PCT Pub. No.: WO2012/006979
PCT Pub. Date: Jan. 19, 2012

(65) Prior Publication Data
US 2013/0056234 A1   Mar. 7, 2013

(30) Foreign Application Priority Data
May 8, 2010   (DE) .......................... 10 2010 019 819

(51) Int. Cl.
*A01B 3/46* (2006.01)
(52) U.S. Cl.
CPC ...................................... *A01B 3/464* (2013.01)
(58) Field of Classification Search
USPC ......... 172/219, 204, 209–211, 319, 324, 328, 172/452, 467, 677, 679
See application file for complete search history.

(56) References Cited

U.S. PATENT DOCUMENTS

| 2,845,014 | A | * | 7/1958 | Pursche | 172/227 |
| 3,039,541 | A | * | 6/1962 | Harden et al. | 172/677 |
| 3,316,981 | A | * | 5/1967 | Jahimiak | 172/255 |
| 3,357,501 | A | * | 12/1967 | Watts | 172/227 |
| 3,428,135 | A | * | 2/1969 | Richey | 172/212 |
| 3,463,510 | A | * | 8/1969 | Van Syoc | 172/7 |
| 3,524,509 | A | * | 8/1970 | Richey | 172/212 |
| 3,532,172 | A | * | 10/1970 | Richey | 172/212 |
| 3,559,745 | A | * | 2/1971 | Thompson et al. | 172/285 |
| 3,589,451 | A | * | 6/1971 | Wenzel et al. | 172/285 |
| 3,598,185 | A | * | 8/1971 | Richey | 172/242 |
| 3,627,058 | A | * | 12/1971 | Johannsen | 172/206 |
| 3,662,840 | A | * | 5/1972 | Richey | 172/224 |
| 3,698,486 | A | * | 10/1972 | Morkoski et al. | 172/212 |
| 3,730,279 | A | * | 5/1973 | Dowdeswell | 172/212 |
| 3,783,950 | A | * | 1/1974 | Geurts | 172/285 |
| 3,830,312 | A | * | 8/1974 | Brandly | 172/225 |
| 3,910,353 | A | * | 10/1975 | Ralston | 172/1 |
| 3,918,528 | A | * | 11/1975 | Kinzenbaw | 172/218 |
| 4,186,806 | A | * | 2/1980 | Ward | 172/283 |
| 4,207,951 | A | * | 6/1980 | Wilcox et al. | 172/225 |
| 4,410,047 | A | * | 10/1983 | Arnold et al. | 172/328 |
| 4,415,040 | A | * | 11/1983 | Salva | 172/225 |

(Continued)

FOREIGN PATENT DOCUMENTS

| DE | 1920899 | 11/1970 |
| DE | 9204130 | 7/1992 |

(Continued)

*Primary Examiner* — Matthew D Troutman
(74) *Attorney, Agent, or Firm* — James Creighton Wray

(57) ABSTRACT

An apparatus for transfer of the weight from the plow to the tractor to improve the traction of the tractor for which the rotational axis 11 is arranged in such a way that the transfer of the weight, at the same time, also effects a required torque for the turning process and an increase in the stability of the tractor during the turning process.

6 Claims, 4 Drawing Sheets

(56) References Cited

U.S. PATENT DOCUMENTS

| | | | |
|---|---|---|---|
| 4,896,731 A * | 1/1990 | Besson | 172/225 |
| 5,314,028 A * | 5/1994 | Mong | 172/219 |
| 5,363,924 A * | 11/1994 | Foley et al. | 172/326 |
| 5,381,866 A * | 1/1995 | Mong | 172/219 |
| 5,396,961 A * | 3/1995 | Coste | 172/219 |
| 5,603,381 A * | 2/1997 | Torgrimsen | 172/219 |
| 5,685,378 A * | 11/1997 | Mong | 172/204 |
| 5,701,960 A * | 12/1997 | Skjaeveland et al. | 172/219 |
| 5,713,421 A * | 2/1998 | Skjaeveland | 172/161 |
| 6,116,351 A * | 9/2000 | Stangeland | 172/225 |
| 8,418,776 B2 * | 4/2013 | Pirotais | 172/7 |

FOREIGN PATENT DOCUMENTS

| | | |
|---|---|---|
| DE | 202009014618 | 3/2011 |
| EP | 0266440 | 5/1988 |
| EP | 1549124 | 7/2005 |
| EP | 2033503 | 3/2009 |
| FR | 2119864 | 8/1972 |

* cited by examiner

SEMI-MOUNTED REVERSIBLE PLOW WITH ROTARY AMPLIFIER

This application claims the benefit of German Application No. 10 2010 019 819.6 filed May 8, 2010, and PCT/DE/2011/00104 filed May 6, 2011, International Publication No. WO 2012/006979, which are hereby incorporated by reference in their entirety as if fully set forth herein.

BACKGROUND OF THE INVENTION

The invention relates to a semi-mounted reversible plow.

SUMMARY OF THE INVENTION

Such a semi-mounted reversible plow can be taken from the European patent specification EP 1 549 124. For this semi-mounted reversible plow there is an hydraulic cylinder placed between the attachment device and the plow frame. This hydraulic cylinder should contribute to improving the traction of the tractor. If the front axis of the tractor is to come under additional load, then a pressing force is generated via the hydraulic cylinder in the upper link of the tractor. If the rear axle of the tractor is to be put under load, EP 1 549 124 teaches that a tractive force must be generated in the upper link of the tractor. This prior art has the disadvantage that a high torque must be generated by the slewing gear during turning of the plow frame. The slewing gear must be designed to be appropriately extensive and heavy and is therefore also expensive. Also all neighboring components must be designed according to the forces arising there, which also has a negative effect on the manufacturing costs. One further comparable semi-mounted reversible plow can be taken from EP 2 033 503. There is also an hydraulic cylinder provided here, as for the semi-mounted reversible plow according to EP 1 549 124, with which the tractive force in the upper link must be generated if the traction of the rear axle of the tractor should be increased through transfer of weight from the semi-mounted plow to the tractor. This is where the disadvantages occur, described above, concerning the high rotational energy required to a high degree since this design of semi-mounted reversible plow with just one wheel as the travel gear on the side on the frame requires a significantly higher rotational energy.

The object of the invention is to create an apparatus which reduces the required rotational energy for turning the plow frame which holds the cost of the slewing gear within reasonable limits, which also increases the static stability of the tractor during the turning process and which also improves the traction of the tractor through transfer of weight from the semi-mounted plow to the tractor.

This object is achieved according to the embodiments disclosed for the present invention.

Since the rotational axis or the imaginary extension of the rotational axis crosses the plow frame in the operating position on the furrow side, at some distance from the center of gravity of the plow frame, the center of gravity of the plow frame lies between the rotational axis or the imaginary extension of the rotational axis and the rotational joint of the travel gear or wheel. Upon actuation of the hydraulic cylinder the weight of the semi-mounted reversible plow is transferred to the tractor and therefore a torque is applied onto the plow frame around the rotational axis. Since the center of gravity of the plow frame is arranged to the side of the rotational axis or the imaginary extension of the rotational axis between the wheel and the rotational axis or the imaginary extension of the rotational axis, actuation of the hydraulic cylinder causes turning of the plow frame if the tractive force in the hydraulic cylinder is made appropriately large. An appropriately low tractive force in the hydraulic cylinder does, on the other hand, only cause a reduction in the required torque which must be delivered by the slewing gear. The magnitude of the reduction in the required torque depends on the distance between the center of gravity of the plow frame and the imaginary extension of the rotational axis and the part of the weight taken on by the hydraulic cylinder. The required torque from the slewing gear and therefore also the size of the hydraulic cylinder of the slewing gear can then be reduced and the stability of the tractor during the turning process increased by this magnitude of the reduction in the required torque. In this way, on the one hand, a weight is transferred from the device to the tractor to obtain better traction and the torque from the slewing gear required for the turning process of the plow frame is reduced significantly.

The invention further provides that the rotational axis or the imaginary extension of the rotational axis is arranged to cross the plow frame in the front area in the operating position. Since the rotational axis or the imaginary extension of the rotational axis crosses the plow frame in the front area, the distance to the center of gravity of the plow frame is relatively large and therefore also the effective lever arm which, together with the lifting force of the hydraulic cylinder, causes reduction of the required torque of the slewing gear for the turning process of the plow frame.

An enlargement of the lever arm is achieved in such a way that the slewing gear or the imaginary extension of the rotational axis is arranged so as to cross the plow frame in the operating position in the area between the first plow body and the third plow body. The reduction in the required torque which must be delivered by the slewing gear for turning the plow frame is increased even further in this way.

According to the invention it is further provided that a draw frame is connected with the attachment frame or with the intermediate frame which is connected in the rear area of the plow frame indirectly or directly with the plow frame or the travel gear. The plow frame with the bodies arranged on it is therefore pulled over the connecting point of the turning arm of the slewing gear with the plow frame and the connecting point of the draw frame with the plow frame or the travel gear. This effects a favorable introduction of the tractive forces into the plow frame.

Here, it is provided for that the draw frame is connected cardanically with the attachment frame or with the intermediate frame and the travel gear and is designed to serve as a torsion resistant stabilizer for fixing the upright position of the wheel. In cases where the travel gear just consists of one wheel then the wheel can be fixed and guided in its upright position using the known method.

DETAILED DESCRIPTION

The invention alternatively also relates to a semi-mounted reversible plow with an attachment frame with a plurality of link points for attachment to the upper and lower link of a tractor as well as a plow frame carrying a plurality of plow bodies, which frame is supported via a travel gear with at least one wheel and is turned over the slewing gear with a rotational axis and turning arm into the respective operating position and is connected pivot-mounted with the attachment frame in a horizontal direction, for which the rotational axis of the slewing gear or the imaginary extension of the rotational axis crosses the plow frame in the operating position on the furrow side at some distance from the center of gravity of the plow frame and for which the upper link is designed as an hydraulic cylinder. For this solution, transfer of weight of the semi-mounted reversible plow to the tractor is not via an hydraulic cylinder integrated on the semi-mounted reversible plow but rather via an hydraulic cylinder designed as an upper link which is arranged between the attachment frame and the tractor. This solution somewhat simplifies the structure of the plow and also offers the option to achieve a comparable effect using less effort overall, as with the version with the hydraulic cylinder integrated in the semi-mounted reversible plow. It is also possible for this solution to have the position of the rotational axis or the position of the imaginary extension of the rotational axis similarly arranged on the furrow side to cross the plow frame at some distance from the center of gravity of the plow frame.

Further details and advantages of the subject of the invention emerge from the following description and the relevant drawings, which show two exemplary embodiments with the necessary details and single parts.

BRIEF DESCRIPTION OF THE DRAWINGS

FIG. 1 shows a side view of the semi-mounted reversible plow 1 in its operating position. The semi-mounted reversible plow 1 comprises the main components attachment frame 5, slewing gear 10, travel gear 8, draw frame 30 and plow frame 7 with the plow bodies 6. The semi-mounted reversible plow 1 is connected with the three-point rod of a tractor via the attachment frame 5. The upper link pivot 4 and the lower link pivots 2 and 3 are provided for this on the attachment frame 5. The attachment frame 5 with its attachment tower 40 has the upright standing axis 41 with which the plow frame 7 and the travel gear 8 are connected pivotably via the intermediate frame 13. The transverse axis 14 is provided on the intermediate frame 13 on the end-side via which the slewing gear 10 is connected pivotably with its cross-member 33. The hydraulic cylinder 15 is connected at some distance from the transverse axis 14 with the cross-member 33 and the intermediate frame 13. Upon actuation the hydraulic cylinder 15 transfers the weight of the plow frame 7 to the attachment frame 5 and therefore to the rear axle of the tractor (not shown). To this effect, the hydraulic cylinder 15 is fitted with one or a multiplicity of hydraulic accumulators (not shown here) which allow adaptation to the ground of the plow frame 7 with the plow bodies 6 while maintaining the transfer of weight of the plow frame to the tractor. The plow bodies 6 are led at operating depth, at the front, by means of the tracing wheel 39 and, at the rear, by means of the travel gear 8 with wheel 9. The cross-member 33 receives the rotational axis 11 and the turning arm 12 which can be seen particularly clearly in FIG. 2. The travel gear 8 is in connection via the draw frame 30 with the attachment frame 5. The draw frame 30 serves in this case as a torsion resistant stabilizer 32 which is connected cardanically via the intermediate link 36 and the intermediate frame 13 with the attachment frame 5. The draw frame 30 or the stabilizer 32 are connected cardanically in the rear area 31 of the semi-mounted reversible plow 1 via the rear transverse axis 62 and the upright axis 63 with the wheel carrier 60, which is pivoted via the hydraulic cylinder 64 around the rear transverse axis 62, wherein the operating depth of the plow bodies 6, amongst other things, can also be changed. The range of swivel of the wheel carrier 60 around the rear transverse axis 62 is limited by a dead stop 66 to secure clearance above the ground. The length of the draw frame 30 and therefore also the front furrow width of the semi-mounted reversible plow 1 can be altered by means of the actuator 65 in the normally known manner. The wheel carrier 60 has the wheel fork 61 in which the wheel 9 is mounted.

FIG. 2 shows a view from above of the semi-mounted reversible plow 1 in its operating position. The semi-mounted reversible plow 1 is overall freely connected around the upright standing axis 41 trailing with the tractor via the attachment frame 5 and the upper link pivot 4 and the lower link pivots 2, 3. The intermediate frame 13 is connected with the upright standing axis 41 which receives the cross-member 33 of the slewing gear 10 with the rotational axis 11 and the turning arm 12. Owing to the particular arrangement of the slewing gear 10, the rotational axis 11 is in a position which ensures that the imaginary extension 16 of the rotational axis 11 crosses the plow frame 7 on the furrow side at some distance 17 from the center of gravity 18 as seen in the direction of the extension 16 of the rotational axis 11. In order to achieve the effect of reducing the required rotational energy, the imaginary extension 16 of the rotational axis 11 must cross the plow frame 7 in the front area 20. In the example according to FIG. 2 the imaginary extension 16 of the rotational axis 11 crosses the plow frame 7 in the area 21, between the first plow body 22 and the third plow body 23. The semi-mounted reversible plow 1 is a semi-mounted reversible plow 1 with a variable operating width adjustment plow body 6. Actuation of the hydraulic cylinder 42 causes the operating width of the individual plow bodies 6 to be altered via the control gear 59. Here, also the wheel arm 57 with the pivot bearing 58 and therefore also the travel gear 8 are adjusted with the wheel 9 in a direction parallel to the direction of operation. The wheel arm 57 with the pivot bearing 58 is connected at the rear of the plow frame 7 with the plow frame 7 via the console 55. Actuation of the hydraulic cylinder 42 causes both the position of the plow frame 7 and the position of the draw frame 30 and the intermediate frame 13 to change. This change in the position of the intermediate frame 13 also causes a change in the position of the imaginary extension 16 of the rotational axis 11 and therefore also the distance 17 of the imaginary extension 16 of the rotational axis 11 to the center of gravity 18. One ensures that the imaginary extension 16 of the rotational axis 11 is always on the furrow side some distance 17 from the center of gravity 18 in every operating width setting. The reduction in the required rotational energy for the slewing gear 10 is optimal if the distance 17 is very large and the lifting force of the hydraulic cylinder 15 is also very large. Conversely, the reduction in the required rotational energy for turning the slewing gear 10 is lower if the lifting force of the hydraulic cylinder 15 is reduced and the distance 17 is smaller. A reduction in the required rotational energy is not possible if the lifting force of the hydraulic cylinder 15 is zero or if the imaginary extension 16 of the rotational axis 11 runs through the center of gravity 18 or on the land side of the center of gravity 18. On the land side means the area 43 which is in the right turning plow position of the semi-mounted reversible plow 1 on the left of the center of gravity 18 of plow frame 7.

FIG. 3 shows a cut out of a side view of the front part of the semi-mounted reversible plow 1. The hydraulic cylinder 15 is, on the one hand, connected to the mounting point 35 of the cross-member 33 and, on the other hand, with the mounting point 34 of the intermediate frame 13. The hydraulic cylinder 15 is arranged here at some distance from the transverse axis 14. The greater the distance apart, the more the weight can be transferred from the plow frame 7 to the tractor for the same lifting force or tractive force of the hydraulic cylinder 15. FIG. 3 also clearly illustrates the arrangement of the intermediate link 36 which connects the draw frame 30 or the stabilizer 32 cardanically with the intermediate frame 13. To this effect, the intermediate link 36 has the vertical axis of traction 37 and the horizontal axis of traction 38.

FIG. 4 shows an alternative solution, without the hydraulic cylinder 15 according to FIG. 1. A trailing arm 52 is used here instead of the hydraulic cylinder 15 which blocks a movement around the axis 14 of the intermediate frame 13 to the cross-member 33. The intermediate frame 13 and the cross-member 33 can also form a unit permanently attached to each other so that the transverse axis 14 and the trailing arm 52 are not needed. Then, the transfer of the weight of the plow frame 7 to the tractor takes place via the upper link which, in this case, is designed as an hydraulic cylinder 50. The lower links 51 are integral parts of the tractor. The hydraulic cylinder 50 is an integral part of the plow. Movability of the hydraulic cylinder 50 can be achieved via the hydraulic accumulators (not shown here), wherein an adaptation to the ground can be secured between the tractor and the semi-mounted reversible plow 1 while maintaining the tractive force in the hydraulic cylinder 50.

Figure 1:
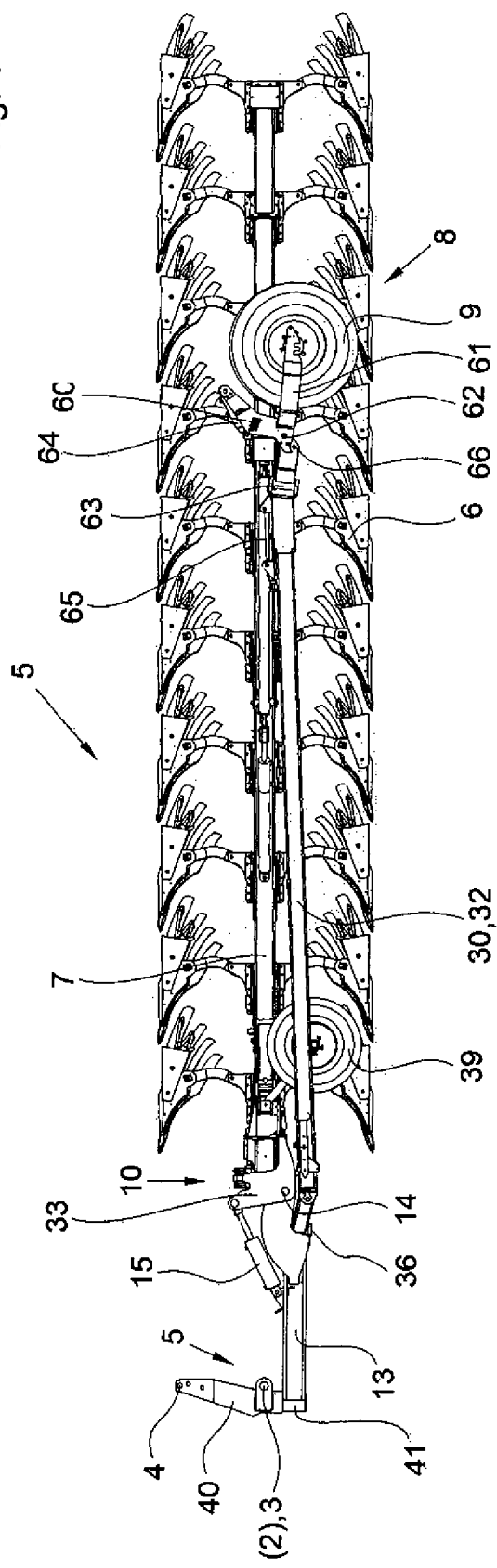
FIG. 1 shows a side view of the semi-mounted reversible plow in its operating position.
Figure 2:
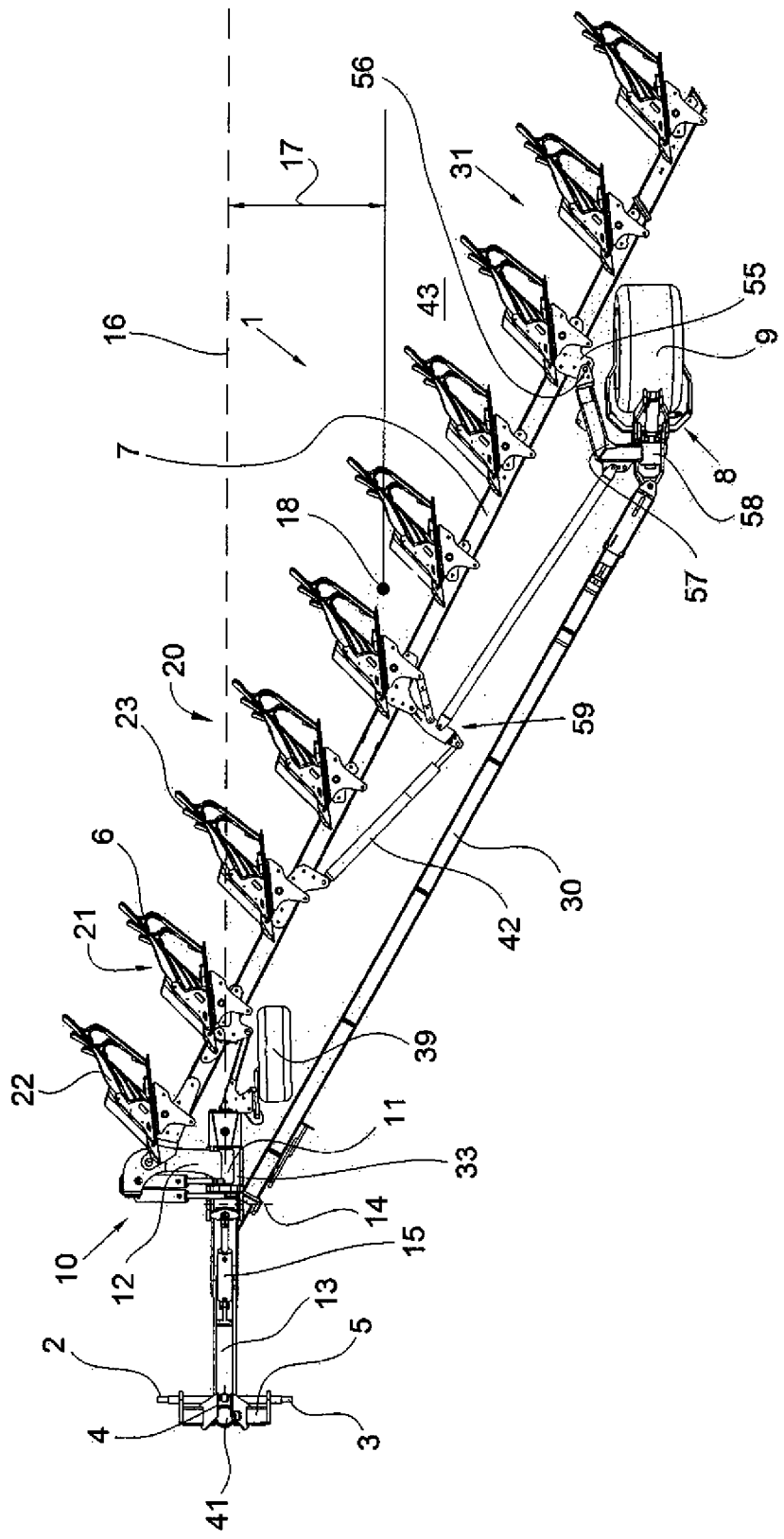
FIG. 2 shows a view from above of the semi-mounted reversible plow in its operating position.
Figure 3:
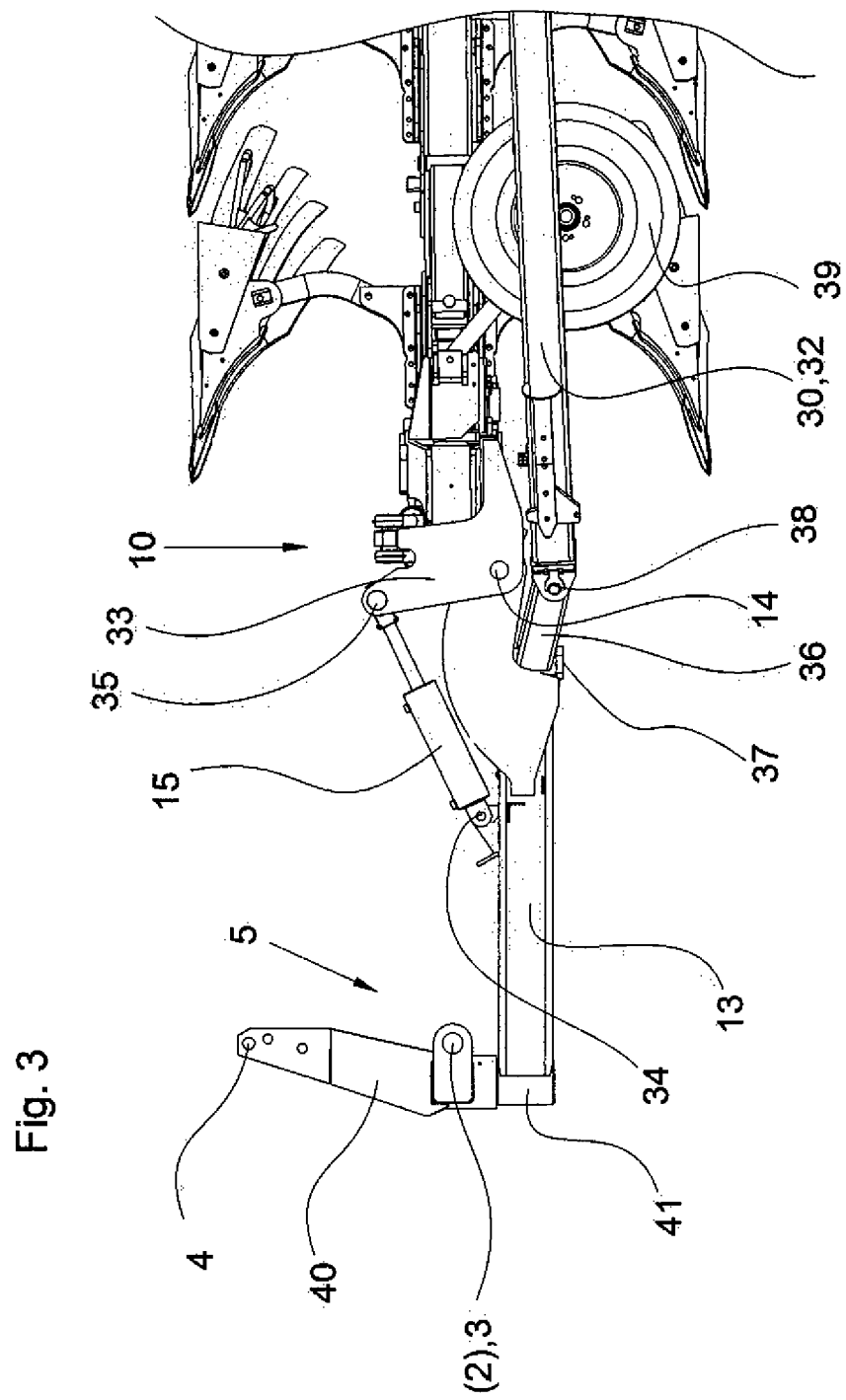
FIG. 3 shows a cut-out of the side view of the front part of the semi-mounted reversible plow according to FIG. 1
Figure 4:
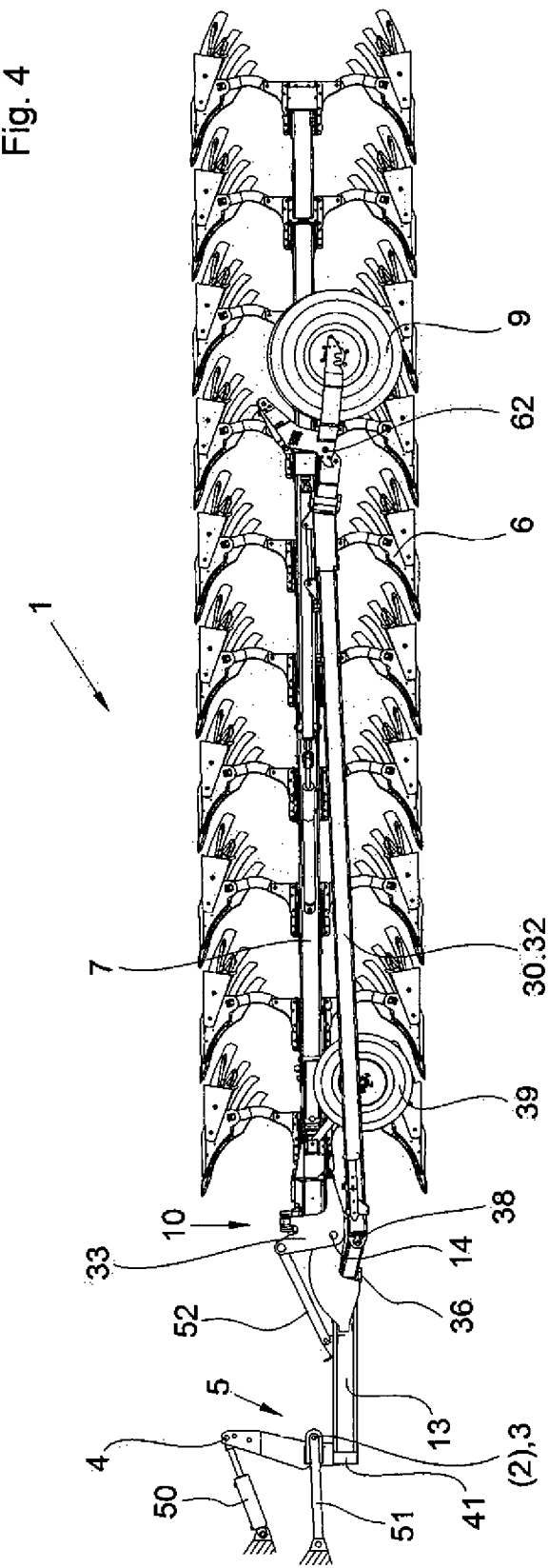
FIG. 4 shows a side view of the semi-mounted reversible plow in its operating position with an hydraulic cylinder functioning as the upper link.

The lifting force or the tractive force of the hydraulic cylinders 15 or 50, both for the design according to FIG. 1 to 3 and also the design according to FIG. 4, can be controlled using a control apparatus, for example dependent on the slip of the drive wheels on the tractor or with a pre-set regulating variable for the tractive force or the lifting force of the respective hydraulic cylinder 15 or 50.

The invention claimed is:

1. A semi-mounted reversible plow (1) comprising an attachment frame (5), wherein the attachment frame (5) has a plurality of link points wherein the link points have an upper link (4) and lower links (2, 3) to attach the attachment frame (5) to a tractor, a vertical axis (41) connected to the attachment frame (5), an intermediate frame (13) attached to the vertical axis (41) and a plow frame (7) pivotally attached to the intermediate frame (13), the plow frame (7) carrying a plurality of plow bodies (6), wherein the plow frame (7) is supported via a travel gear (8) with at least one wheel (9), wherein the plow frame (7) is turned into a respective operating position via a slewing gear (10) having a rotational axis (11), a turning arm (12), and a cross-member (33), wherein the slewing gear (10) is connected pivotably with the intermediate frame (13), and the intermediate frame (13) is pivot-mounted in a horizontal direction around the upright standing axis (41) and is overall rotationally freely connected for trailing the tractor and the attachment frame (5) with the lower links (2, 3), wherein a transverse axis (14) is provided between the plow frame (7) and the intermediate frame (13), and a hydraulic cylinder (15) is arranged above the transverse axis and is connected to the cross-member 33 and to the intermediate frame (13), wherein weight of the semi-mounted reversible plow (1) can be transferred to the tractor by the cross member (33), the hydraulic cylinder (15), the intermediate frame (13) and the attachment frame (5), wherein a torque is applied onto the plow frame (7) around the rotational axis (11), wherein the rotational axis (11) of the slewing gear (10) or an imaginary extension (16) of the rotational axis (11) is arranged to cross the plow frame (7) in the operating position on a furrow side from the center of gravity (18) of the plow frame (7).

2. The semi-mounted reversible plough according to claim 1, wherein the rotational axis (11) or the imaginary extension (16) of the rotational axis (11) is arranged to cross the plow frame (7) in the operating position in a front area (20).

3. The semi-mounted reversible plough according to claim 1, wherein the rotational axis (11) or the imaginary extension (16) of the rotational axis (11) is arranged to cross the plow frame (7) in the operating position in the area (21) between a first plow body (22) and a third plow body (23) in the plurality of plow bodies (6).

4. The semi-mounted reversible plough according to claim 1, further comprising a draw frame (30) connected with the intermediate frame (13), and wherein the draw frame (30) is connected to a rear area (31) of the plow frame (7) via an arm (57), wherein the arm (57) is also connected to the travel gear (8).

5. The semi-mounted reversible plow according to claim 4, wherein the draw frame (30) is connected with the intermediate frame (13) and the travel gear (8) and is a torsion resistant stabilizer (32) for fixing an upright position of the wheel (9).

6. A semi-mounted reversible plow (1) comprising an attachment frame (5), wherein the attachment frame has a plurality of link points (2, 3, 4) having upper and lower links to attach to a tractor, a vertical axis (41) connected to the attachment frame (5), and an intermediate frame (13) connected to the a vertical axis (41), a plow frame (7) connected to the intermediate frame (13), the plow frame (7) carrying a plurality of plow bodies (6), wherein the plow frame (7) is supported via a travel gear (8) with at least one wheel (9), wherein the plow frame (7) is turned via a slewing gear (10) with a rotational axis (11) and turning arm (12) into an operating position of the plow frame (7), and wherein the plow frame (7) is connected pivotably with the intermediate frame (13) and is pivot-mounted in a horizontal direction, wherein the rotational axis (11) of the slewing gear (10) or an imaginary extension (16) of the rotational axis (11) is arranged to cross the plow frame (7) in the operating position on a furrow side at some distance (17) from a center of gravity (18) of the plow frame (7) and the plow bodies (6), and wherein the upper link is an hydraulic cylinder (50) with which weight of the semi-mounted reversible plow (1) can be transferred to the tractor by a lifting torque applied to the attachment frame (5).

* * * * *